Sept. 10, 1968  H. G. SCHWARTZ  3,400,745
PNEUMATIC TIRE
Filed July 15, 1966

*INVENTOR*
HAROLD G. SCHWARTZ

BY *Raymond E. Blomstedt*

*ATTORNEY*

United States Patent Office 3,400,745
Patented Sept. 10, 1968

3,400,745
PNEUMATIC TIRE
Harold G. Schwartz, Akron, Ohio, assignor to E. I. du Pont de Nemours and Company, Wilmington, Del., a corporation of Delaware
Filed July 15, 1966, Ser. No. 565,558
3 Claims. (Cl. 152—209)

ABSTRACT OF THE DISCLOSURE

Improper use, excessive wear, and underinflation of a pneumatic tire is signaled by a tread design comprising an "added shoulder rib" adjacent to and outside at least one of the regular shoulder ribs, said "added shoulder rib" comprising a plurality of nubs spaced along the perimeter of the tire.

---

This invention relates to pneumatic tires and more particularly to an improved pneumatic tire having a design which readily indicates improper use, excessive wear or under-inflation.

Conventional pneumatic tires used on automotive vehicles are capable of withstanding considerable abuse, but obviously the useful lives of these tires would be significantly extended if this abuse was eliminated. In many instances tire abuse is due to ignorance on the part of the user that a misuse is occurring. The mounting interest in automotive safety emphasizes the long felt need for a means for indicating to a driver of a vehicle any dangerously worn tires or unsafe practices with respect to tire condition and use.

One frequent misuse of tires occurs when an automobile is cornered too rapidly (a corner is turned at a speed too high for safety and reasonably long tire life). Many drivers who corner too fast would undoubtedly discontinue this practice if they were reminded when a safe and reasonable speed was exceeded.

Similarly many drivers operate their automobiles with tires which are dangerously underinflated considering the load which they carry and have no reasonably accurate way of knowing what air pressure to utilize for best tread wear and safety. A means for providing such drivers with an easy and accurate way of making this determination would obviously promote safety as well as economical tire use.

A further safety hazard in automotive travel is the use of excessively worn tires. A means for advising a driver of unduly worn tires could have lives and promote safety to a considerable degree.

In accordance with this invention there is provided a pneumatic tire constructed in a conventional manner except for having a tread design which serves to provide a audible indication of under-inflation and/or excessive wear as well as indicating audibly when a safe cornering speed or one consistent with reasonable tread life is being exceeded. The tire of this invention provides this signal during use by producing an audible and irritating signal when a vehicle fitted with such a tire is in motion under any of the above described unsafe conditions. When such a vehicle corners at a rate of speed which exceeds that reasonable for safety and average tread wear life, a signal is clearly heard so that speed can be immediately reduced. In this respect the present invention has an educational aspect by way of teaching drivers the maximum safe speeds for cornering. The signal is also clearly heard when such a tire is not properly inflated relative to the load it bears or is in an excessively worn condition. Tire manufacturers are well aware of what the maximum tread wear of a tire should be consistent with safety and can utilize the principle of the present invention so that a thumping audible signal will be heard during motion of a vehicle when a predetermined amount of tread has been worn from the tire or when the tire is inflated at a pressure below a safe level.

The thumping signal produced by tires of this invention during dangerous usage is provided by an "added shoulder rib" (ASR) lying outside and just below each of the conventional shoulder ribs of a pneumatic automotive tire. The "added shoulder rib" like the shoulder rib itself circumscribes the tire except that the ASR is discontinuous and comprises a plurality of protuberances, nubs, or knobs at spaced intervals around the circumference of the tire and just outside of and lower than each of the conventional shoulder ribs of the tire.

The appearance of the tire of the present invention and the manner in which it accomplishes its signal producing function will be more readily understood by reference to the accompanying drawings.

Figure 1:
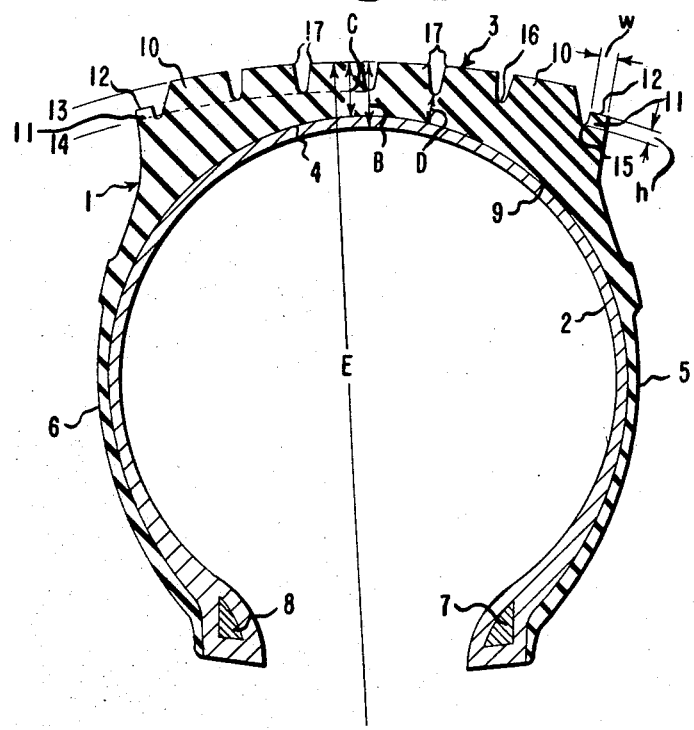
FIGURE 1 is a sectional view of a tire taken perpendicularly to its principal axis of rotation.
Figure 2:
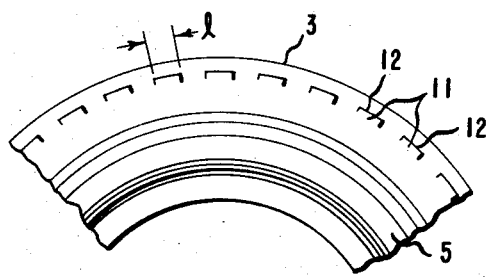
FIGURE 2 is a side view of a tire parallel to its principal axis of rotation.

In FIGURE 1 a pneumatic tire generally indicated by numeral 1 comprises a rubberized body portion of the carcass 2 having a tread 3 superimposed and bonded to the crown area 4 of the carcass. Rubber side walls 5 and 6 extend from the recessed edge of the tread of the carcass to the bead portions 7 and 8.

The outer ribs 10 are conventionally referred to as shoulder ribs and the characteristic "added shoulder ribs" of tires of this invention are designated by numerals 11. The dimension B from the underside of the carcass 2 vertically to the top of the tread 3 is referred to as "total centerline gauge." The dimension C from the top surface of the cords 9 in the outer ply adjacent to the tread to the top of the tread 3 is referred to as "tread center gauge." The dimension D from the top surface of the cords in the outer ply adjacent to the tread 9 to the bottom of the groove in the tread 3 is referred to as "under tread gauge." Tread radius E is the radius of the arc formed by the tread surface measured in a plane perpendicular to the principal axis of rotation of the tire.

With respect to the "added shoulder rib" 11 which is characteristic of the tire of this invention, it will be noted that the upper extremity 12 of this "added shoulder rib" is significantly below the curve 13 of the top of the tread 3 and above the curve 14 of the tread groove bottoms 16 of the main ribs 17 so that the "added shoulder rib" is not in contact with the ground during proper use of the tire when the tire is properly inflated and not unduly worn. However, the upper extremity 12 of the "added shoulder rib" has height sufficiently close to that of the tread so that when the tire is under-inflated and/or when the tire is excessively worn, the nubs of the "added shoulder rib" will make contact with the ground during rotation and create an audible or vibrational signal which can be clearly heard or felt by the driver of a vehicle fitted with the tire thereby indicating an unsafe condition. Similarly when a vehicle fitted with such a tire is cornered too fast transverse motion of the tire caused by centrifugal force moves the "added shoulder rib" nubs into contact with the ground again creating a clear signal begging the driver to reduce speed until the signal is eliminated.

The precise size of the "added shoulder rib" will depend to a large extent upon the size of the tire in which it is incorporated as well as the load, construction, tread width and depth and type of the automotive vehicle on which it is used. One standard defines a worn out tire as one with 1/16 of an inch or less of remaining tread depth. Tires of the present invention are easily accommodated to such a safety standard by merely manufacturing them so that the upper extremity 12 of the "added shoulder rib" is located at a height to provide a signal under predetermined conditions of wear. Similarly the size of the "added shoulder rib" can be easily predetermined to accommodate the need for a signal in the case of underinflation and excessive speed or cornering using factors, measurements and principles well known to the automotive pneumatic tire industry such as elasticity, elongation, tensile strength, rigidity, susceptibility to distortion and the like of the materials utilized in a particular tire in combination with the particular tire structure employed.

The automotive tires of this invention are particularly useful for automobiles but obviously have utility in all automotive vehicles such as trucks, scooters, motor cycles and the like where an audible signal indicating underinflation, excessive wear or excessive high speed cornering are of concern. This invention may be practiced with tires containing any type of rubber or elastomeric material or any type of tire cord or other material used in tire construction. Natural rubber or synthetic rubbers such as ethylene-propylene terpolymer (EPT) rubber and blends of synthetic and natural rubbers may be utilized to advantage. Similarly the tire cords may be nylon, rayon, polyester, metal or any other material suitable for preparing a pneumatic tire. Normally the "added shoulder ribs" characterizing the novel tires of this invention are integral with the elastomeric material of the tire and of the same material but it can be of a different material if desired. Obviously if made of a hard material the signal generated will be of greater intensity.

There is also an advantage in having a small but discontinuous rib or series of nubs embedded in the center or near the center of the tire as an added indication of the undue tire wear. Again it is only necessary to have this added rib depressed below the normal useful tread surface so that it will not contact the ground until the tire has worn to the point where a signal is desired.

The improved pneumatic tire of this invention is easily constructed by simply designing a conventional tire tread mold to provide for the "added shoulder rib" of this invention. Thereafter the manufacture involves simply molding the tire in conventional manner. Normally the nubs will have the configuration shown in the drawings with a length ($l$) (along the periphery of the tire) of from about ¼–1 inch, preferably ⅓ inch, a width ($w$) of about ⅛–⅓ inch, preferably ¼ inch, and a height ($h$) above its groove 15 about ⅛–½ inch, preferably about ¼ inch.

Although in a preferred embodiment of this invention the nubs forming the "added shoulder rib" are integral with the elastomeric material of the tire and formed during the molding of the tire, other means of manufacture can be used. Thus the nubs can be attached by adhesion or other means to a preformed tire if desired. Also it is not necessary that the nubs be of soft or elastomeric material; they can be formed from a non-elastic or hard abrasive material substance.

I claim:

1. In a pneumatic tire having a tread with shoulder ribs, the improvement in combination therewith comprising an "added shoulder rib" adjacent to and outside at least one of said shoulder ribs and in the form of a plurality of nubs spaced along the periphery of the tire between the side wall and said shoulder rib, the upper extremities of said nubs lying between the curve of the original tread surface and the curve of the tread groove bottoms whereby the "added shoulder rib" is adapted to produce a repetitive signal when the "added shoulder rib" contacts pavement during tire rotation.

2. The tire of claim 1 in which the nubs are integral with elastomeric material of the tire carcass.

3. The tire of claim 2 in which the nubs and tread consist of ethylene-propylene terpolymer and the nubs have the dimensions: $l=$¼–1 inch, $w=$⅛–⅓ inch, $h=$¼–¾ inch.

References Cited

UNITED STATES PATENTS

| | | | |
|---|---|---|---|
| 1,462,984 | 7/1923 | Schenuit | 152—352 |
| 3,024,825 | 3/1962 | Kutsmichel | 152—209 |

DRAYTON E. HOFFMAN, *Primary Examiner.*